UNITED STATES PATENT OFFICE.

FRANZ BECKMANN, OF WARSAW, RUSSIA.

SIZE-POWDER.

976,116.
No Drawing.

Specification of Letters Patent. Patented Nov. 15, 1910.
Application filed Setpember 8, 1909. Serial No. 516,801.

*To all whom it may concern:*

Be it known that I, FRANZ BECKMANN, merchant, citizen of Germany, subject of the King of Prussia and Emperor of Germany, residing at Warsaw, 16 Nowy Swiat, in the Kingdom of Poland and Empire of Russia, have invented certain new and useful Improvements in Size-Powders, of which the following is a full, clear, and exact description.

The object of this invention is to provide a size powder which will serve as a medium for binding together paint colors, for pasting on wall papers, and for bookbinding.

I have found that sticky substances which are difficultly or slowly soluble in cold water, for instance wheat flour, gum arabic, and gum tragacanth, when powdered and mixed with other sticky substances which are easily soluble in cold water, such as dextrin or sugar, also become easily and quickly soluble. The explanation presumably lies in the fact that the difficultly-soluble bodies are by this treatment surrounded by easily-soluble bodies, so the dissolving medium is enabled to reach the individual particles of the difficultly-soluble substances, without the same becoming a solid mass.

In practice the size powder is made as follows: About 50% of gum arabic is mixed with 5% of wheat flour and from 2 to 10% of gum tragacanth, and there are added to this mixture suitable quantities of easily-soluble substances, for instance, 25% dextrin, 15% sugar. These substances are thoroughly mixed together, and there is then added a small percentage of a proper antiseptic. The result is a powder which is handled commercially in this form. In order to obtain the proper size powder for the requisite purposes, it is only necessary to work this product with cold water into a dough of suitable consistency, and in about fifteen minutes the sticky substance is ready for use.

Two important facts have been observed. One is that it is not always possible to obtain, with the proportions given, a normal product, as the various gums used possess quite different physical and chemical properties. For instance, pure gum arabic is soft, and for this reason requires a smaller percentage of the easily-soluble mixture for obtaining a sticky substance than do harder gums. Of the different kinds of gums handled commercially, the pure gum arabic is the softest, the Congo gum the toughest. In order therefore to obtain an even size powder, it is necessary to use a factor for regulating the hardness or softness of the gum, and this factor is supplied in the use of a larger or smaller percentage of gum tragacanth. A further observation is that for obtaining a product having binding properties suitable for printing and bookbinding, for use with glass, tin or metal, or for printing wall papers, the best results can be obtained by the use of a particular kind of flour, viz., buckwheat flour. As has been found by comparative experiments, it is not sufficient to merely combine with each other gum, dextrin and sugar. Such a mixture is always unsatisfactory. On the one hand, it is deficient in the solidity; on the other, it lacks sufficient binding capacity to hold color. By using buckwheat flour there is obtained a greater porosity, which is especially important when using fatty colors.

I claim:—

1. A size powder, consisting of a mixture of gum arabic, about 50%, flour, about 5%, gum tragacanth, 2 to 10%, dextrin, about 25%, and sugar, about 15%.

2. A size powder, consisting of a mixture of gum arabic, about 50%, buckwheat flour, about 5%, gum tragacanth, 2 to 10%, dextrin, about 25%, and sugar, about 15%.

In witness whereof, I subscribe my signature, in presence of two witnesses.

FRANZ BECKMANN.

Witnesses:
BROMISLAW GOLDMAN,
IGNACY TEJCHFELD.